US007838163B2

(12) United States Patent
Nishida et al.

(10) Patent No.: US 7,838,163 B2
(45) Date of Patent: Nov. 23, 2010

(54) FUEL CELL

(75) Inventors: Tsunemasa Nishida, Toyota (JP); Toshiyuki Suzuki, Toyota (JP); Tsutomu Ochi, Toyota (JP); Naohiro Takeshita, Toyota (JP); Hiroo Yoshikawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 490 days.

(21) Appl. No.: 11/663,929

(22) PCT Filed: Nov. 16, 2005

(86) PCT No.: PCT/JP2005/021395

§ 371 (c)(1), (2), (4) Date: Mar. 27, 2007

(87) PCT Pub. No.: WO2006/054756

PCT Pub. Date: May 26, 2006

(65) Prior Publication Data

US 2007/0264555 A1 Nov. 15, 2007

(30) Foreign Application Priority Data

Nov. 16, 2004 (JP) ............................. 2004-331675

(51) Int. Cl.
*H01M 8/02* (2006.01)
*H01M 8/24* (2006.01)

(52) U.S. Cl. ....................................... 429/457; 429/514

(58) Field of Classification Search .................. 429/38, 429/39, 457, 514
See application file for complete search history.

(56) References Cited

U.S. PATENT DOCUMENTS 4,743,518 A * 5/1988 Romanowski ............ 429/39 X
6,245,453 B1 * 6/2001 Iwase et al. ............... 429/38 X
7,326,486 B2 * 2/2008 Hibino et al. ................ 429/39

FOREIGN PATENT DOCUMENTS

JP 07-335234 A 12/1995
JP 11-185778 A 7/1999
JP 2000-012050 A 1/2000
JP 2001-143725 A 5/2001
JP 2002-082482 A 3/2002
JP 2002-198069 A 7/2002
JP 2003-077497 A 3/2003
JP 2003-086197 A 3/2003
JP 2003-142126 A 5/2003

* cited by examiner

*Primary Examiner*—Stephen J. Kalafut
(74) *Attorney, Agent, or Firm*—Kenyon & Kenyon LLP

(57) ABSTRACT

A fuel cell including separators opposing each other and squeezing a power generating reaction portion. Each of the separators includes a gas passage, a gas passage dividing rib, and a protrusion formed in the gas passage. In a first separator, which is an at least one separator of the separators opposing each other via the power generating reaction portion, at a region of the first separator opposing a gas passage dividing rib of a second separator, which is a separator opposing the first separator, a squeezing rib is formed and replaces the protrusion. The squeezing rib and the gas passage dividing rib of the second separator squeezes the power generating reaction portion. At the region of the first separator, a contact area of the squeezing rib with the power generating reaction portion is adapted to be larger than a contact area of the protrusion of the first separator with the power generating reaction portion in a case where the protrusion were formed without forming the squeezing rib.

10 Claims, 5 Drawing Sheets

FUEL CELL

This is a 371 national phase application of PCT/JP2005/021395 filed 16 Nov. 2005, which claims priority of Japanese Patent Application No. 2004-331675 filed 16 Nov. 2004, the contents of which are incorporated herein by reference.

FIELD OF THE INVENTION

The present invention relates to a fuel cell.

BACKGROUND OF THE INVENTION

A fuel cell (cell), for example, a solid polymer electrolyte-type fuel cell, includes a layer of a membrane-electrode assembly (MEA) and a separator. The MEA includes an electrolyte membrane of an ion-exchange membrane, an electrode 14 (e.g., an anode, a fuel electrode) including a catalyst layer disposed on one side of the electrolyte membrane, and another electrode (e.g., a cathode, an air electrode) including a catalyst layer disposed on the other side of the electrolyte membrane. Diffusion layers may be disposed between the MEA and the separators, on the anode side and the cathode side, respectively. The MEA and the diffusion layers form a power generating reaction portion and are squeezed by an anode separator and a cathode side separator.

At a power generating region of the fuel cell, in the separators, a fuel gas passage for supplying fuel gas (e.g., hydrogen) to the anode and an oxidant gas passage for supplying oxidant gas (e.g., oxygen, usually, air) to the cathode are formed. At a surface of the separator, opposite the fuel gas passage and at a surface of the separator opposite the oxidant gas passage, a coolant passage for letting coolant (e.g., cooling water) flow is formed in the separators. At the power generating region of the fuel cell, the separators squeeze the MEA via the diffusion layers, whereby power is generated accompanied by production of water.

Conventionally, as disclosed in Japanese Patent Publication No. 2001-143725 and in FIGS. 12-15, when the reactant gas passages (the fuel gas passage 3 and the oxidant gas passage 4) are a serpentine passage (a passage having a turn portion in a serpentine manner), the separators 1 and 2 squeezing the power generating reaction portion 5 include a gas passage dividing rib 6 defining the serpentine passage and a lot of protrusions 7 formed in the passage. Further, when the reactant gas passages are a serpentine passage, although the reactant gas is consumed in the power generation, in order to ensure a gas speed higher than a predetermined speed, a passage width D2 at a downstream portion is adapted to be smaller than a passage width D1 at an upstream portion.

In the conventional separators, because an amount of consumed hydrogen and an amount of consumed oxygen in air differ from each other, and because gas passage division ratios by the gas passage dividing rib 6 of fuel gas side and oxidant gas side differ from each other, when the separators 1 and 2 squeeze the power generating reaction portion 5, the gas passage dividing rib 6 of the anode-side separator and the gas passage dividing rib 6 of the cathode-side separator do not coincide with each other. This occurs usually in a layering direction of the separator 1, the power generating reaction portion 5, and the separator 2. As a result, as illustrated in FIG. 14, at a region where the gas passage dividing rib 6 and the protrusion 7 squeeze the power generating reaction portion 5, a portion between adjacent protrusions 7 (a gas flow portion) cannot push the power generating reaction portion 5 against the gas passage dividing portion 6, whereby the power generating reaction portion 5 is deformed into a wavy shape to form a gas leakage passage 9 between the gas passage dividing rib 6 and the power generating reaction portion 5. As a result, as illustrated in FIG. 15, an amount of short-circuit gas flowing between gas passage portions located on opposite sides of the gas passage dividing portion 6 increases, whereby a problem that the power generating efficiency of the fuel cell lowers is caused.

If the gas dividing ribs 6 of the separators 1 and 2 were located so as to oppose each other in order to decrease the amount of gas passing under the gas passage dividing rib 6, the gas passage division ratio of the gas passage of at least one of the separators 1, 2 would be inappropriate. Thus, problems such as excessive or insufficient supply of reactant gas and insufficient blow-off of product water by gas flow, etc. may be newly caused.

Objects of the present invention include providing a fuel cell which can decrease an amount of gas passing under a gas passage dividing rib and maintaining a gas passage division ratio of a gas passage to a conventional ratio by increasing an area where separators contact a power generating reaction portion from opposite sides of the power generating reaction portion.

SUMMARY OF THE INVENTION

The above-described object can be attained by the following fuel cell according to the present invention:

(1) A fuel cell includes separators opposing each other via a power generating reaction portion disposed between the separators.

Each of the separators includes a gas passage, a gas passage dividing rib partitioning one portion of the gas passage from an adjacent portion located adjacent to the one portion, and a protrusion formed in the gas passage.

In a first separator, which is an at least one separator of the separators opposing each other via the power generating reaction portion, at a region (S) opposing a gas passage dividing rib of a second separator (which is a separator opposing the first separator), a squeezing rib is formed and replaces the protrusion. The squeezing rib of the first separator and the gas passage dividing rib of the second separator squeeze the power generating reaction portion.

At the region (S) of the first separator, a contact area (S1) of the squeezing rib with the power generating reaction portion is adapted to be larger than a contact area (S2) of the protrusion of the first separator with the power generating reaction portion in a case where the protrusion were formed without forming the squeezing rib at the region (S) of the first separator.

(2) A fuel cell according to item (1) above, wherein the squeezing rib is adapted to be longer, in a direction in which the gas passage dividing rib of the first separator extends, than the protrusion in a case where the protrusion were formed without forming the squeezing rib at the region (S) of the first separator.

(3) A fuel cell according to item (1) above, wherein the squeezing rib has a tunnel-like communicating passage causing the gas passage portions located on opposite sides of the squeezing rib to communicate with each other.

(4) A fuel cell according to item (1) above, wherein the squeezing rib is divided into a plurality of divided portions in a direction parallel to a direction in which the gas passage dividing rib of the first separator extends. Opposing ends of adjacent divided portions are overlapped to each other in the extending direction of the squeezing rib when viewed in a direction perpendicular to the extending direction of the squeezing rib.

(5) A fuel cell according to item (1) above, wherein the squeezing rib is divided into a plurality of divided portions in a direction parallel to a direction in which the gas passage dividing rib of the first separator extends. A space between adjacent divided portions is adapted to be smaller than a space between adjacent protrusions in a case where the protrusion were formed without forming the squeezing rib at the region (S) of the first separator.

(6) A fuel cell according to item (1) above, wherein a gas passage division ratio by the gas passage dividing rib of the first separator where the squeezing rib is formed is the same as a gas passage division ratio by the gas passage dividing rib of the first separator in a case where the protrusion were formed without forming the squeezing rib at the region (S) of the first separator.

(7) A fuel cell according to item (1) above, wherein the gas passage is a serpentine passage. A width of the serpentine passage is adapted to be such that a width of a downstream portion of the serpentine passage is smaller than a width of an upstream portion of the serpentine passage.

(8) A fuel cell according to item (1) above, wherein the separator is a carbon separator.

(9) A fuel cell according to item (1) above, wherein the separator is a metal separator.

(10) A fuel cell according to item (1) above, wherein the gas passage is a serpentine passage.

(11) A fuel cell according to item (1) above, wherein the gas passage is a straight passage.

TECHNICAL ADVANTAGES OF THE PRESENT INVENTION

According to the fuel cell of items (1)-(11) above, the contact area (S1) of the squeezing rib with the power generating reaction portion is adapted to be larger than the contact area (S2) of the protrusion of the first separator with the power generating reaction portion if the protrusion were formed without forming the squeezing rib at the region (S) of the first separator. By forming the squeezing rib, an area where the separators contact the power generating reaction portion from opposite sides of the power generating reaction portion increases compared with the case where the protrusion were formed without forming the squeezing rib. As a result, an amount of gas passing under a gas passage dividing rib can be decreased.

Items (2)-(5) show various structures for making a contact area of the squeezing rib with the power generating reaction portion larger than a contact area of the protrusion with the power generating reaction portion in the case where the protrusion were formed without forming the squeezing rib at the region (S) of the first separator.

According to the fuel cell of item (6) above, since the gas passage division ratio by the gas passage dividing rib of the first separator where the squeezing rib is formed is the same as the gas passage division ratio by the gas passage dividing rib of the first separator in the case where the protrusion were formed without forming the squeezing rib at the region (S) of the first separator, the amount of gas passing under the gas passage dividing rib can be decreased by the squeezing rib, thus, maintaining the gas passage division ratio equal to the conventional gas passage division ratio.

According to the fuel cell of item (7) above, since the width of the downstream portion of the serpentine passage is smaller than the width of the upstream portion of the serpentine passage, a gas passage division ratio equal to the conventional gas passage division ratio can be adopted, and problems such as excessive or insufficient supply of reactant gas and insufficient blow-off of product water by gas flow, etc., which would arise if the gas dividing ribs of the opposing two separators were located so as to oppose each other, can be suppressed.

DETAILED DESCRIPTION OF THE PREFERRED EMBODIMENTS

A fuel cell according to the present invention will be explained with reference to FIGS. 1-11.

Figure 4:
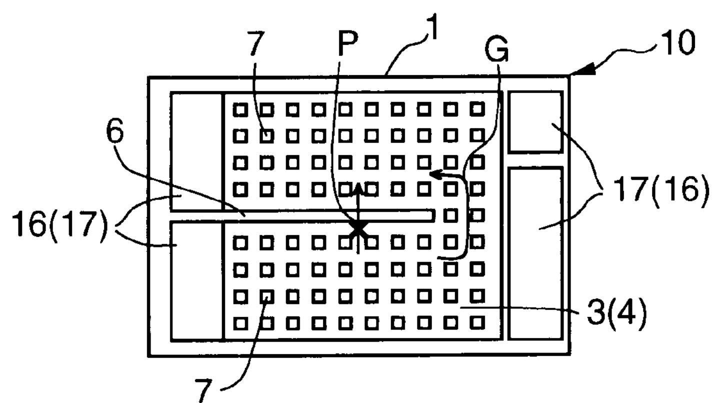
FIG. 4 is an elevational view of the separator of FIG. 1 illustrating that gas is suppressed from passing under the gas passage dividing rib in the fuel cell according to the first embodiment of the present invention.
Figure 5:
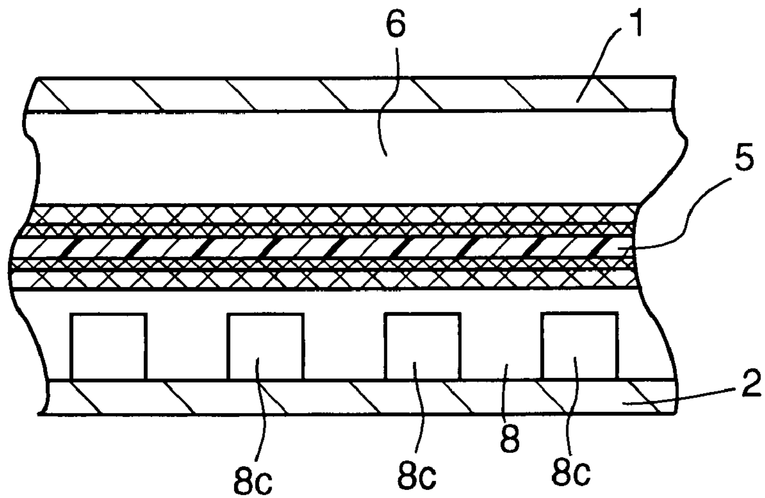
FIG. 5 is a cross-sectional view of a fuel cell according to a second embodiment of the present invention at a position where a squeezing rib and a gas passage dividing rib are located.
Figure 6:
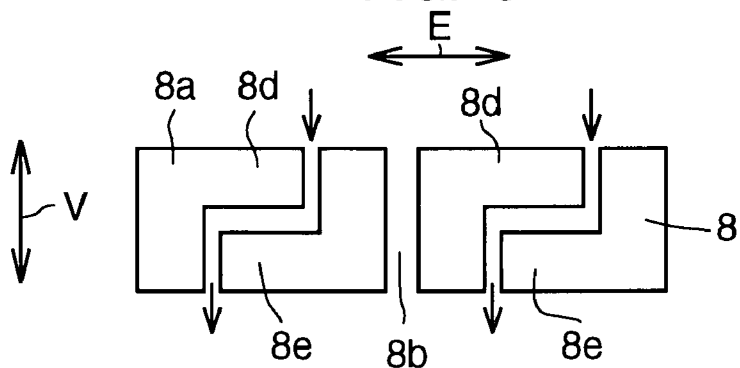
FIG. 6 is a plan view of a squeezing rib of a fuel cell according to a third embodiment of the present invention.
Figure 7:
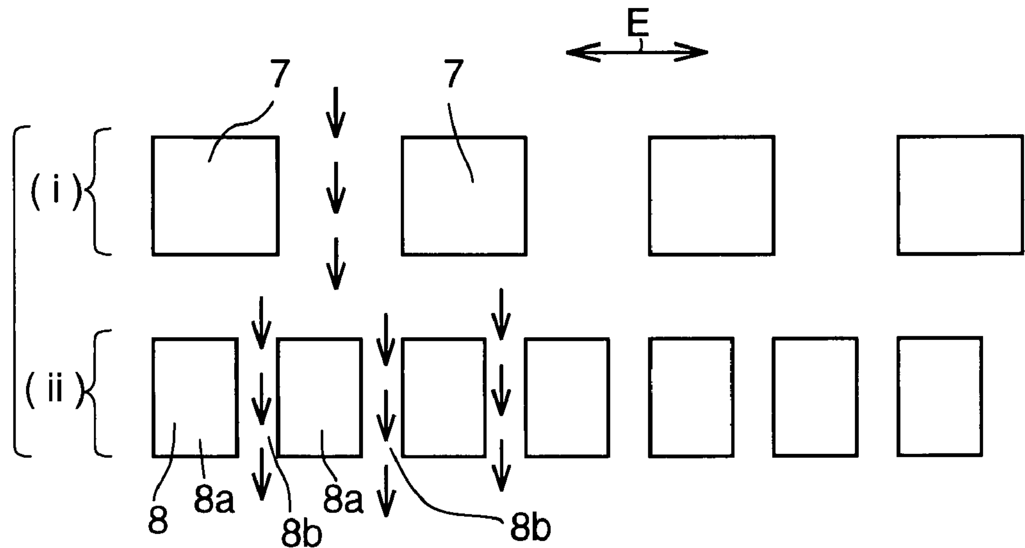
FIG. 7 is a plan view of a squeezing rib of a fuel cell according to a fourth embodiment of the present invention, shown in comparison with a conventional protrusion.
Figure 8:
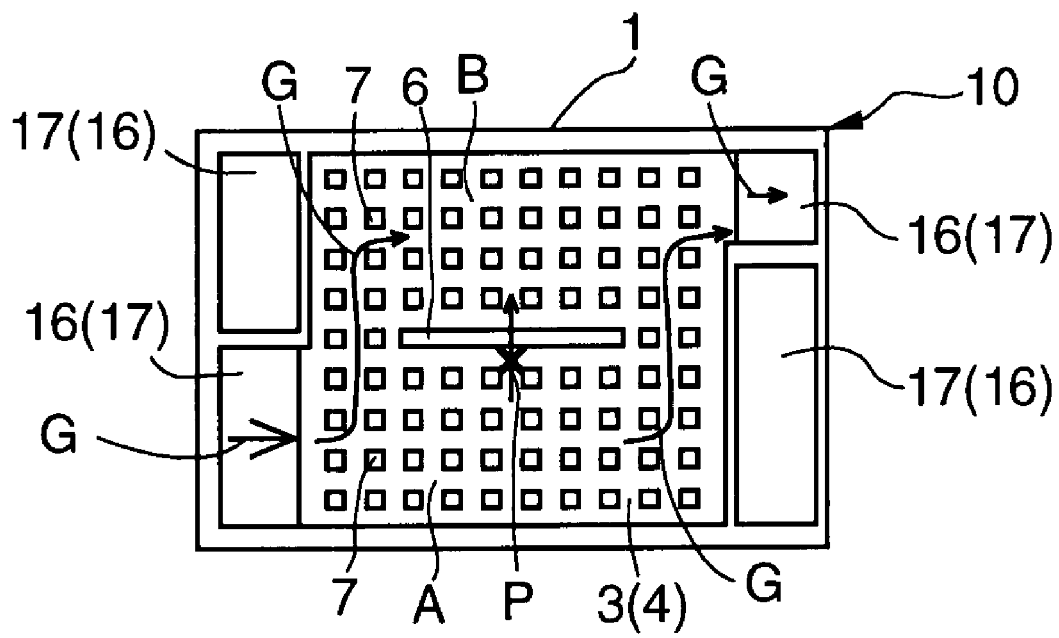
FIG. 8 is an elevational view of one of separators squeezing a power generating reaction portion of a fuel cell according to a fifth embodiment of the present invention (i.e., a separator opposing a separator where a squeezing rib is formed).
Figure 9:
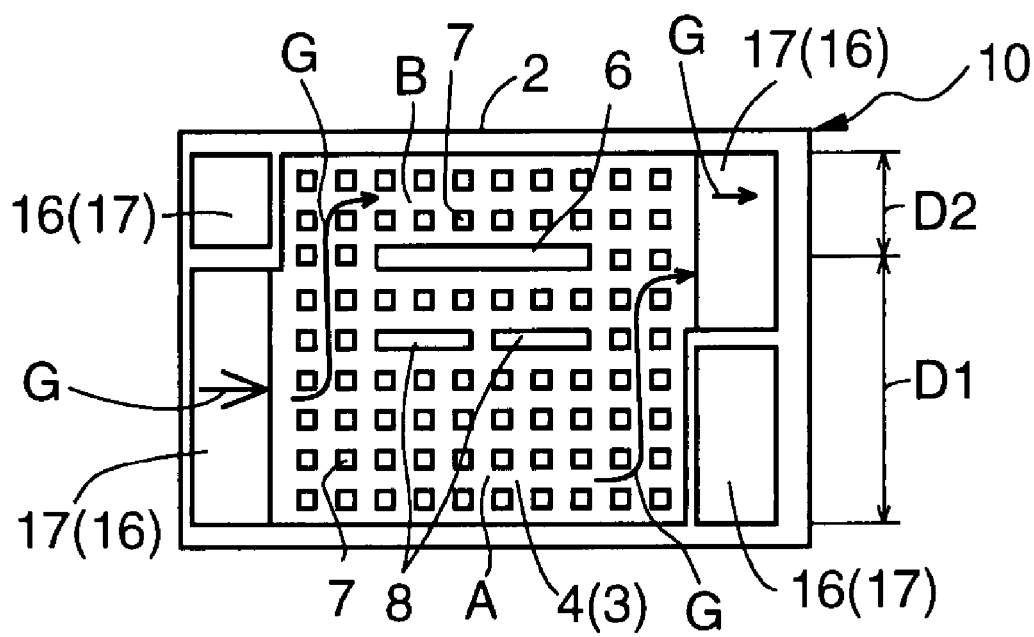
FIG. 9 is an elevational view of the other of the separators squeezing the power generating reaction portion of the fuel cell according to the fifth embodiment of the present invention (i.e., the separator where the squeezing rib is formed).
Figure 10:
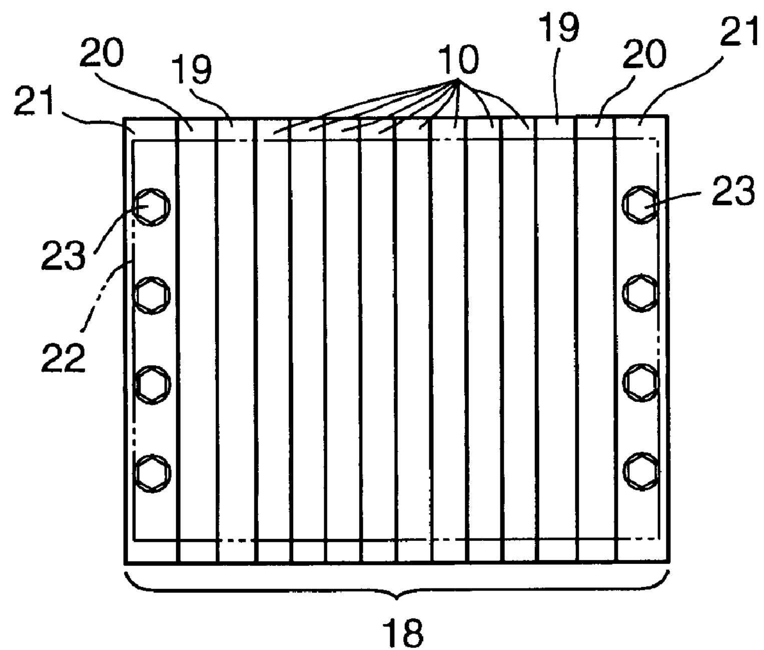
FIG. 10 is a side elevational view of a stack of the fuel cells of the first-fifth embodiments of the present invention.
Figure 11:
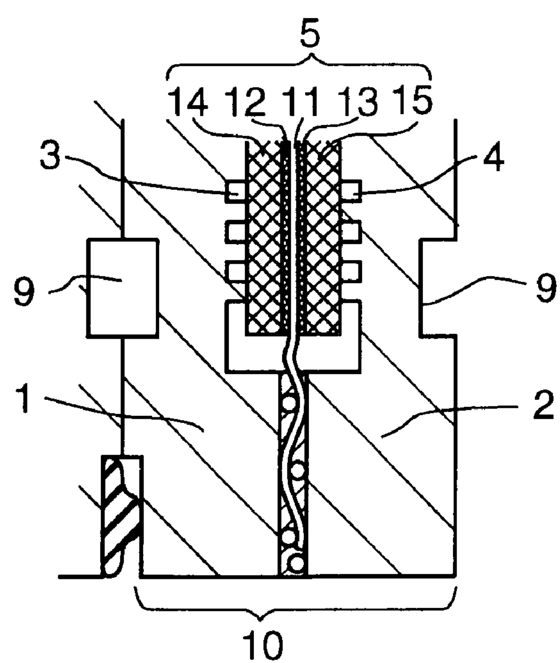
FIG. 11 is a cross-sectional view of a portion of the stack of the fuel cells according to the first through fifth embodiments of the present invention.
Figure 12:
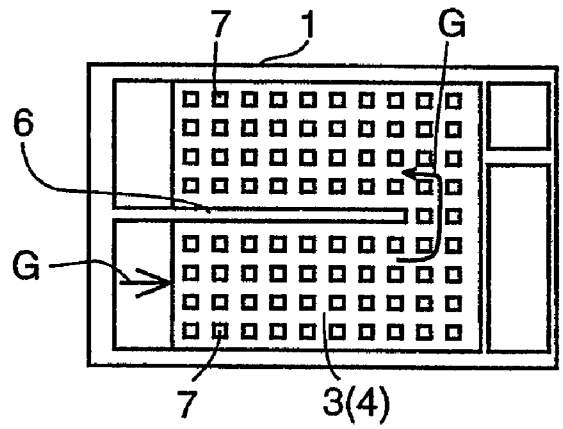
FIG. 12 is an elevational view of one of separators squeezing a power generating reaction portion of a conventional fuel cell (i.e., a separator corresponding to the separator of FIG. 1 of the present invention).
Figure 13:
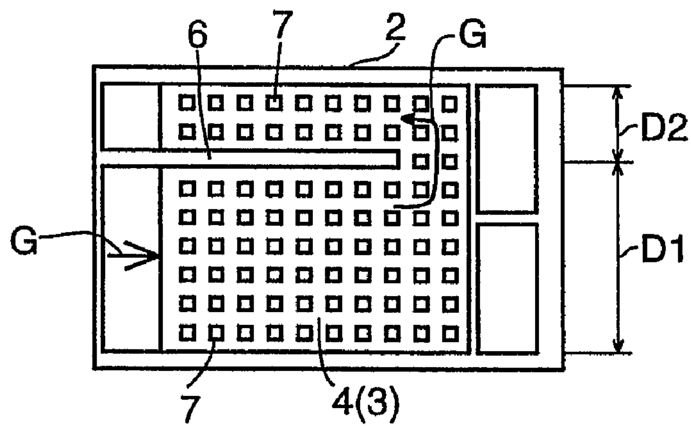
FIG. 13 is an elevational view of the other of the separators squeezing the power generating reaction portion of the conventional fuel cell (i.e., a separator corresponding to the separator of FIG. 2 of the present invention).
Figure 14:
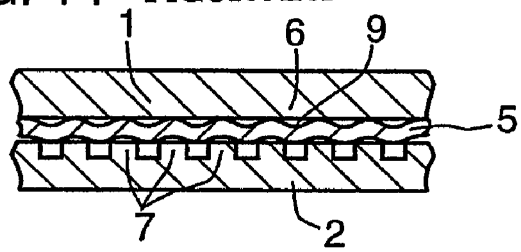
FIG. 14 is a cross-sectional view of the conventional fuel cell at a position of the gas passage dividing rib of FIGS. 12 and 13.

FIGS. 1-4 illustrate a first embodiment of the present invention, FIG. 5 illustrates a second embodiment of the present invention, FIG. 6 illustrates a third embodiment of the present invention, FIG. 7 illustrates a fourth embodiment of the present invention in comparison with a conventional fuel cell, and FIGS. 8 and 9 illustrate a fifth embodiment of the present invention. FIGS. 10 and 11 are applicable to any embodiment of the present invention.

Portions common to or similar throughout all of the embodiments of the present invention are denoted with the same reference numerals throughout all of the description and illustrations of the embodiments of the present invention.

First, portions common to or similar throughout all of the embodiments of the present invention will be explained with reference to FIGS. 1-4, FIG. 10 and FIG. 11.

A fuel cell 10 of the present invention is, for example, a PEFC (Polymer Electrolyte Fuel Cell), but not limited to a PEFC so long as the fuel cell includes a gas passage and a gas passage dividing rib. The fuel cell 10 is mounted to, for example, a fuel cell vehicle. However, the fuel cell 10 may be used for other purposes, and may be, for example, a stationary fuel cell may be used in a home.

As illustrated in FIGS. 10 and 11, the PEFC 10 includes a layer of a membrane-electrode assembly (MEA), a first separator 1 and a second separator 2 (hereinafter, separator 1 and separator 2). A direction of the layer is arbitrary, and may be horizontal or vertical.

The MEA includes an electrolyte membrane 11 of an ion-exchange membrane, an electrode (an anode 12, a fuel electrode) including a catalyst layer disposed on one side of the membrane 11, and another electrode (a cathode 13, an air electrode) including a catalyst layer disposed on the other side of the membrane 11. Diffusion layers 14 and 15 may be disposed between the MEA and the separators, on the anode side and the cathode side, respectively.

The MEA and the diffusion layers 14 and 15 construct a power generating reaction portion 5. The power generating reaction portion 5 is squeezed or disposed between the anode side separator and the cathode side separator.

The MEA and the separators 1 and 2 are layered to construct a single fuel cell 10. At least one fuel cell 10 forms a fuel cell module. A plurality of fuel cell modules are layered to form a stack of fuel cells, and electrical terminals 19, electrical insulators 20, and end plates 21 are disposed at opposite ends of the stack of fuel cells. The stack of fuel cells is tightened in the fuel cell stacking direction. The end plates 21 are coupled to a fastening member (for example, a tension plate 22) extending in a fuel cell stacking direction outside the stack of fuel cells, by bolts 23 and/or nuts, whereby a fuel cell stack 18 is formed.

The separator may be a carbon separator which is made by forming a mixture of carbon powder and synthetic resin binder into a separator configuration. The separator may be a metal separator which is made by press-forming a metal plate. The metal separator may be a combination of the metal separator and a synthetic resin frame. More particularly, in the press-formed metal separator made by press-forming a metal plate having a substantially constant thickness, a concave portion operating as a gas or coolant passage at one surface becomes a convex portion operating as a partition of the passage at the other surface. The present invention is applicable to such a press-formed metal separator.

At the power generating region of the fuel cell, in one of the separators 1 and 2 (for example, in the separator 1), a fuel gas passages 3 for supplying fuel gas (e.g., hydrogen) to the anode 12 is formed, and in the other of the separators 1 and 2 (for example, in the separator 2), an oxidant gas passage 4 for supplying oxidant gas (e.g., oxygen, usually, air) to the cathode 13 is formed. The separator where the fuel gas passage 3 is formed is an anode side separator, and the separator where the oxidant gas passage 4 is formed is a cathode side separator. In the drawings, arrow G illustrates a gas flow in the gas passages 3 and 4.

Preferably, the fuel gas passage 3 and the oxidant gas passage 4 are a serpentine passage which is turned one or more times at an intermediate portion of the passage between an inlet and an outlet of the passage; however, the fuel gas passage 3 and the oxidant gas passage 4 may be a straight passage.

In the separators 1 and 2, a coolant (e.g., cooling water) passage is formed at a surface of the separator opposite the fuel gas passage 3 and at a surface of the separator opposite the oxidant gas passage 4.

At the power generating region of the fuel cell, the separators 1 and 2 push the MEA via the diffusion layers 14 and 15. During power generation, water is produced.

In a case where the reactant gas passages 3 and 4 are a serpentine passage, in order that a gas flow speed equal to or higher than a predetermined gas flow speed can be obtained irrespectively of consumption of the oxidant gasses during power generation, a width D2 of the downstream portion of the gas passage is adapted or determined to be larger than a width D1 of the upstream portion of the gas passage.

As illustrated in FIGS. 1-4, in each separator 1, 2, a fuel gas manifold 16 for supplying the fuel gas to the fuel gas passage 3 and for exhausting the fuel gas from the fuel gas passage 3 is formed, and an oxidant gas manifold 17 for supplying the oxidant gas to the oxidant gas passage 4 and for exhausting the oxidant gas from the oxidant gas passage 4 is formed. A coolant manifold (not shown) for supplying the coolant to the coolant passage 9 and for exhausting the coolant from the coolant passage 9 is also formed.

On the anode 12 of each fuel cell 10, there occurs an ionization reaction that hydrogen changes to hydrogen ions (i.e., protons) and electrons. The hydrogen ions move through the electrolyte membrane 11 to the cathode 13 where the hydrogen ions react with oxygen supplied and electrons (which are generated at an anode of an adjacent MEA and move to the cathode of the instant MEA through a separator) to form water as follows:

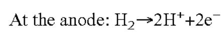

At the anode: $H_2 \rightarrow 2H^+ + 2e^-$

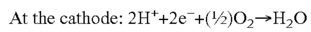

At the cathode: $2H^+ + 2e^- + (1/2)O_2 \rightarrow H_2O$

A region where power generating reaction is performed (the region where the power generating reaction portion 5 exists and also there are the fuel gas passage 3 to which fuel gas is supplied and the oxidant gas passage 4 to which oxidant gas is supplied) is a power generating region.

As illustrated in FIGS. 1-4, the separators 1 and 2 oppose each other and squeeze the power generating reaction portion 5, which includes the MEA and the diffusion layers. The separator 1, 2 includes the fuel gas passage 3 which may be a serpentine passage or a straight passage, or the oxidant gas passage 4 which may be a serpentine passage or a straight passage. The separators I and 2 include a gas passage dividing rib 6 and a protrusion 7 (corresponding to the protrusion 7 of FIGS. 12-15) formed in the gas passage 3 and 4. The gas passage dividing rib 6 partitions a portion A of the gas passage 3, 4 from another portion B adjacent to the portion A.

The gas passage dividing rib 6 is located between portion A and portion B adjacent portion A and separates portions A and B from each other. In a case of a serpentine passage, the gas passage dividing rib 6 separates a portion upstream of a turn portion of the serpentine passage from a portion downstream of the turn portion of the serpentine passage so as to suppress or prevent gas from passing under the gas passage dividing rib 6 from the portion upstream of the turn portion to the portion downstream of the turn portion so that the gas flows along the serpentine passage. The protrusions 7 are located in the gas passage portions A and B in a manner of a lattice and has a configuration of a square, a rectangle, or a circle, etc.

In a first separator, which is an at least one separator of the separators 1 and 2 opposing each other via the power generating reaction portion 5 (for example, the first separator is separator 2, or separator 1, or both of separator 2 and separator 1), at a region (S) of the first separator opposing the gas passage dividing rib 6 of a second separator which is a separator opposing the first separator (for example, when the first separator is separator 2, the second separator is separator 1), a squeezing rib 8 is formed so as to substitute or replace the protrusion 7. The squeezing rib 8 of the first separator and the gas passage dividing rib 6 of the second separator squeeze the power generating reaction portion 5 which includes the MEA and the diffusion layers.

Figure 1:
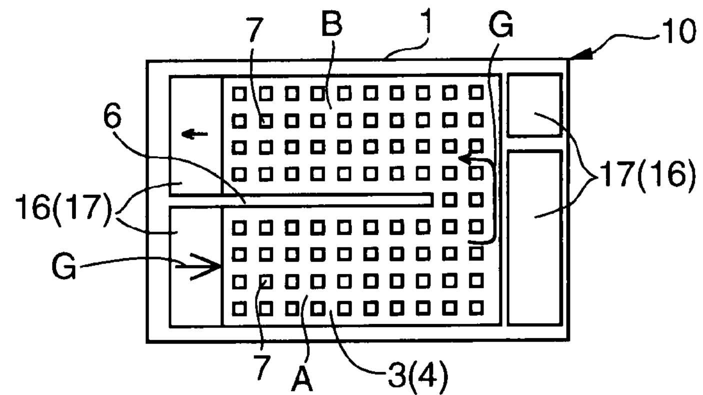
FIG. 1 is an elevational view of one of separators squeezing a power generating reaction portion of a fuel cell according to a first embodiment of the present invention (i.e., a separator opposing a separator where a squeezing rib is formed).
Figure 2:
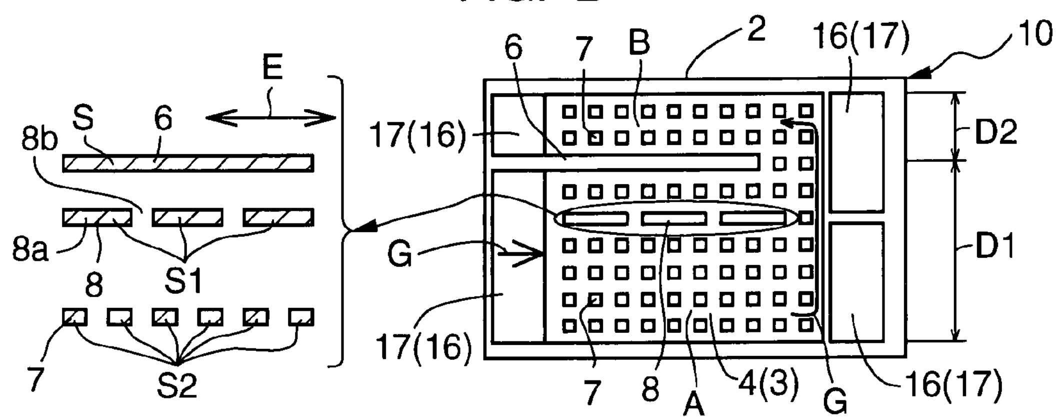
FIG. 2 is an elevational view of the other of the separators squeezing the power generating reaction portion of the fuel cell according to the first embodiment of the present invention (i.e., the separator where the squeezing rib is formed).
Figure 3:
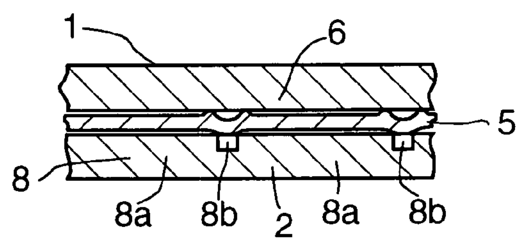
FIG. 3 is a cross-sectional view of the fuel cell according to the first embodiment of the present invention at a position of the gas passage dividing rib of FIGS. 1 and 2.

As illustrated in FIG. 2, in the first separator which is an at least one separator of the separators 1 and 2 opposing each other via the power generating reaction portion 5 (for example, the first separator is separator 2, or separator 1, or both of separator 2 and separator 1), at the region (S) of the first separator opposing the gas passage dividing rib 6 of the second separator which is a separator opposing the first separator (for example, when the first separator is separator 2, the second separator is separator 1), a contact area (S1) of the squeezing ribs 8 (all of the squeezing ribs 8 located at the region (S)) with the power generating reaction portion 5 is adapted to be larger than a contact area (S2) of the protrusions 7 (all of the protrusions 7 located at the region (S)) of the first separator with the power generating reaction portion 5 in the case (corresponding to the case illustrated in FIGS. 12-15) where the protrusion 7 were formed without forming the squeezing rib 8 at the region (S) of the first separator. (S1), (S2) is a summation of a plurality of areas of top portions of the ribs, protrusions (7), respectively.

The gas passage division ratio (in an embodiment of FIG. 2, D1:D2) by the gas passage dividing rib 6 of the first separator where the squeezing rib 8 is formed (for example, the first separator is separator 2, or separator 1, or both of separator 2 and separator 1) is maintained to be the same as the gas passage division ratio (D1:D2 of FIG. 13) by the gas passage dividing rib 6 of the first separator in the case (in the case of FIGS. 12-15) where the protrusion 7 is formed in the first separator without forming the squeezing rib 8.

In the case of the serpentine passage, a width D2 of the downstream portion of the gas passage is adapted or determined to be larger than a width D1 of the upstream portion of the gas passage. This is because a gas flow speed equal to or higher than a predetermined gas flow speed can be obtained irrespectively of consumption of the oxidant gasses during power generation.

Effects and technical advantages according to the structures common to all of the embodiments of the present invention will now be explained.

Figure 15:
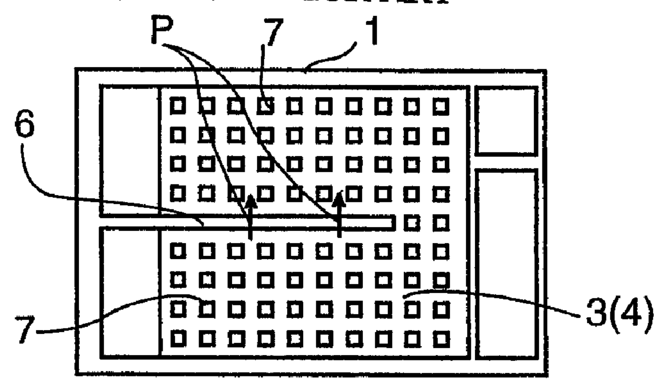
FIG. 15 is an elevational view of the separator of FIG. 12 illustrating that gas passes through under the gas passage dividing rib in the conventional fuel cell.

Since, at the region (S) of the first separator where the first separator opposes the gas passage dividing rib 6 of the second separator (a separator opposing to the first separator where the squeezing rib 8 is formed), the contact area (S1) of the squeezing rib 8 of the first separator with the power generating reaction portion 5 is adapted to be larger than the contact area (S2) of the protrusion 7 of the first separator with the power generating reaction portion 5 in the case where the protrusion 7 were formed without forming the squeezing rib 8 at the region (S) of the first separator, due to the squeezing rib 8, an area where the separators contact the power generating reaction portion 5 from opposite sides of the power generating reaction portion increases, compared with the case (the case of FIGS. 12-15) where the protrusion 7 were formed without forming the squeezing rib 8. As a result, an amount of gas passing under a gas passage dividing rib 6 can be decreased. More particularly, in the conventional fuel cell, as illustrated in FIG. 15, there is a gas flow (P) passing under the gas passage dividing rib 6. In contrast, in the present invention, as illustrated in FIG. 4, the gas flow (P) passing under the gas passage dividing rib 6 is suppressed. (In FIG. 4, suppression of the passing gas flow is shown by "X", and therefore, a short-circuit flow denoted with "X" is suppressed (here, "suppressed" means that the flow may not be absolutely zero).

Further, since the gas passage division ratio (in an embodiment of FIG. 2, D1:D2) by the gas passage dividing rib 6 of the first separator where the squeezing rib 8 is formed (for example, the first separator is separator 2, or separator 1, or both of separator 2 and separator 1) is maintained to be the same as the gas passage division ratio (D1:D2 of FIG. 13) by the gas passage dividing rib 6 of the first separator in the case (in the case of FIGS. 12-15) where the protrusion 7 is formed in the first separator without forming the squeezing rib 8 at the region (S), the amount of gas flow (P) passing under the gas passage dividing rib 6 can be decreased by the squeezing rib 8, maintaining the gas passage division ratio equal to the conventional gas passage division ratio, therefore, maintaining gas speed and gas pressure at gas passage portions on opposite sides of the gas passage dividing rib 6 equal to the conventional ones.

The above effects and technical advantages are obtained irrespective of whether the separators 1, 2 are a carbon separator or a metal separator and whether the gas passage is a serpentine passage or a straight passage.

In the case where the gas passage is a serpentine passage, by maintaining the gas passage division ratio the same as the conventional gas passage division ratio, the width (D2) of the downstream portion of the serpentine passage is smaller than the width (D1) of the upstream portion of the serpentine passage, whereby problems such as excessive or insufficient supply of reactant gas and insufficient blow-off of product water by gas flow, etc., which may arise if the gas dividing ribs of the opposing two separators were located so as to oppose each other, can be suppressed.

Next, structures, effects and technical advantages unique to each embodiment of the present invention will be explained.

With Embodiment 1 of the present invention, as illustrated in FIGS. 1-4, the squeezing rib 8 is divided into a plurality of divided portions **8*a*. Each divided portion 8*a* is a longitudinal rib having a length longer than a length of the protrusion 7 in a direction (E) in which the squeezing rib 8 extends. (Direction (E) is parallel to a direction in which the gas passage dividing rib 6 extends.) A space 8*b* between the longitudinal ribs 8*a* is equal to or smaller than a space between the protrusions 7. A height of the longitudinal rib 8*a* is equal to or substantially equal to a height of the protrusion 7**.

The separators 1 and 2 may be a carbon separator or a metal separator. The gas passages 3 and 4 may be a serpentine passage or a straight passage.

With effects and technical advantages of Embodiment 1 of the present invention, by constructing the squeezing rib 8 from a plurality of longitudinal ribs **8*a*, the contact area of the squeezing rib 8 with the power generating reaction portion 5 is caused to be larger than the contact area of the protrusion 7 with the power generating reaction portion 5 in the case where the protrusion 7 were formed at the region (S) of the first separator where the first separator opposes the gas passage dividing rib of the opposing separator, without forming the squeezing rib at the region (S) of the first separator. Since a space between the protrusions 7, which are replaced by the longitudinal rib 8***a* is removed, a wavy configuration of the power generating reaction portion 5 and a gas passing gap due to the wavy configuration are removed or nearly removed. As a result, gas flow passing under the gas passage dividing rib 6 is suppressed.

With Embodiment 2 of the present invention, as illustrated in FIG. 5, the squeezing rib 8 includes a tunnel-like communicating passage 8*c* causing the gas passage portions located on opposite sides of the squeezing rib to communicate with each other. The communicating passage 8*c* penetrates the squeezing rib 8 in a direction perpendicular to the direction (E) in which the squeezing rib 8 extends.

The separators 1 and 2 may be a carbon separator or a metal separator. The gas passages 3 and 4 may be a serpentine passage or a straight passage.

With effects and technical advantages of Embodiment 2 of the present invention, since the squeezing rib 8 has the tunnel-like communicating passage 8*c* causing the gas passage portions located on opposite sides of the squeezing rib to communicate with each other, the squeezing rib 8 can contact the power generating reaction portion 5 over an entire length of the squeezing rib, the contact area of the squeezing rib 8 with the power generating reaction portion 5 can be made larger than the contact area of the protrusion 7 with the power generating reaction portion 5 in the case where the protrusion 7 were formed at the region (S) of the first separator where the first separator opposes the gas passage dividing rib of the opposing separator, without forming the squeezing rib at the region (S) of the first separator. Since a space between the protrusions 7, which are replaced by the squeezing rib 8 is removed, a wavy configuration of the power generating reaction portion 5 and a gas passing gap due to the wavy configuration are removed or nearly removed. As a result, gas flow passing under the gas passage dividing rib 6 is suppressed.

With Embodiment 3 of the present invention, as illustrated in FIG. 6, the squeezing rib 8 is divided into a plurality of divided portions 8*a* in a direction parallel to the direction (E) in which the gas passage dividing rib 6 of the first separator extends. Opposing ends of adjacent divided portions 8*a* are overlapped to each other in the extending direction (E) of the squeezing rib when viewed in a direction (V) perpendicular to the extending direction (E) of the squeezing rib. This overlapping structure can be easily obtained by overlapping a stepped portion 8*d* formed in one of the adjacent divided portions 8*a* and another stepped portion formed in the other of the adjacent divided portions 8*a* to each other in the squeezing rib extending direction. The stepped portions 8*d* and 8*e* can be replaced by surfaces inclined from the direction (V) perpendicular to the squeezing rib extending direction (E).

The separators 1 and 2 may be a carbon separator or a metal separator. The gas passages 3 and 4 may be a serpentine passage or a straight passage.

With effects and technical advantages of Embodiment 3 of the present invention, since the opposing ends of adjacent divided portions 8*a* are overlapped to each other in the extending direction (E) of the squeezing rib when viewed in the direction (V) perpendicular to the extending direction (E) of the squeezing rib, the squeezing rib 8 can contact the power generating reaction portion 5 at the top surface of the rib over the entire length of the rib. As a result, the contact area of the squeezing rib 8 with the power generating reaction portion 5 can be made larger than the contact area of the protrusion 7 with the power generating reaction portion 5 in the case where the protrusion 7 were formed at the region (S) of the first separator where the first separator opposes the gas passage dividing rib of the opposing separator, without forming the squeezing rib at the region (S) of the first separator. Since a space between the protrusions 7 which are replaced by the squeezing rib 8 is removed, a wavy configuration of the power generating reaction portion 5 and a gas passing gap due to the wavy configuration are removed or nearly removed. As a result, gas flow passing under the gas passage dividing rib 6 is suppressed.

With Embodiment 4 of the present invention, as illustrated in FIG. 6, the squeezing rib 8 is divided into a plurality of divided portions (divided ribs) 8*a* (more in number than the protrusions 7 in a row parallel to the squeezing rib 8) in a direction parallel to the direction (E) in which the gas passage dividing rib 6 of the first separator extends. A space 8*b* between opposing ends of adjacent divided portions 8*a* is smaller than the space 7a between the protrusions 7 in the case (the conventional case) where the protrusion 7 were formed at the region (S) of the first separator where the first separator opposes the gas passage dividing rib of the opposing separator, without forming the squeezing rib at the region (S) of the first separator. In FIG. 7, (i) illustrates an arrangement of the conventional protrusions 7, and (ii) illustrates an arrangement of the protrusions 7 relating to the present invention.

The separators 1 and 2 may be a carbon separator or a metal separator. The gas passages 3 and 4 may be a serpentine passage or a straight passage.

With effects and technical advantages of Embodiment 4 of the present invention, since the squeezing rib 8 is divided into a plurality of divided portions 8*a* (more than the protrusions 7 in a row parallel to the squeezing rib 8) and the space 8*b* between the opposing ends of adjacent divided portions 8*a* is smaller than the space 7a between the protrusions 7 in the conventional case, the contact area of the squeezing rib 8 with the power generating reaction portion 5 can be made larger than the contact area of the protrusion 7 with the power generating reaction portion 5 in the case where the protrusion 7 were formed at the region (S) of the first separator where the first separator opposes the gas passage dividing rib of the opposing separator, without forming the squeezing rib at the region (S) of the first separator. Further, since a space between protrusions becomes small by replacing the conventional protrusion 7 with the squeezing rib 8, a wavy configuration of the power generating reaction portion 5 and a gas passing gap due to the wavy configuration are removed or nearly removed. As a result, an amount of the gas flow (P) passing under the gas passage dividing rib 6 is suppressed.

In Embodiments 1-4 above, though the extending directions of the gas passage dividing ribs of the opposing separators are parallel to each other, the present invention is applicable to a fuel cell where the extending directions of the gas passage dividing ribs of the opposing separators cross (for example, cross at a right angle) to each other. To achieve such a structure, the squeezing rib of one separator may be disposed to extend in the same direction as a direction in which the gas passage dividing rib of an opposing separator extends, irrespective of an extending direction of the gas passage dividing rib of the one separator.

With Embodiment 5 of the present invention, as illustrated in FIGS. 8 and 9, the squeezing rib 8 is divided into a plurality of divided portions 8*a*. Each divided portion 8*a* is a longitudinal rib having a length longer than a length of the protrusion 7 in a direction (E) in which the squeezing rib 8 extends. (Direction (E) is parallel to a direction in which the gas passage dividing rib 6 extends.) A space 8*b* between the longitudinal ribs 8*a* is equal to or smaller than a space between the protrusions 7. A height of the longitudinal rib 8*a* is equal to or substantially equal to a height of the protrusion 7. The squeezing rib 8 and the gas passage dividing rib 6 are located on opposite sides of the MEA and oppose to each other.

The separators 1 and 2 may be a carbon separator or a metal separator. The gas passages 3 and 4 are a straight passage.

With effects and technical advantages of Embodiment 5 of the present invention, since the squeezing rib 8 is constructed from a plurality of longitudinal ribs, the contact area of the squeezing rib 8 with the power generating reaction portion 5 can be made larger than the contact area of the protrusion 7 with the power generating reaction portion 5 in the case where the protrusion 7 were formed at the region (S) of the first separator where the first separator opposes the gas passage dividing rib of the opposing separator, without forming the squeezing rib at the region (S) of the first separator. Further, since a space between protrusions becomes small by replacing the conventional protrusion 7 with the squeezing rib 8, a wavy configuration of the power generating reaction portion 5 and a gas passing gap due to the wavy configuration are removed or nearly removed. As a result, an amount of the gas flow passing under the gas passage dividing rib 6 is suppressed.

The invention claimed is:

1. A fuel cell including separators opposing each other via a power generating reaction portion disposed between the separators, each of the separators including a gas passage, a gas passage dividing rib partitioning one portion of the gas passage from an adjacent portion located adjacent to the one portion, and a plurality of protrusions formed in the gas passage, wherein in a first separator which is an at least one separator of the separators opposing each other via the power generating reaction portion, at a region of the first separator opposing a gas passage dividing rib of a second separator which is a separator opposing the first separator, a squeezing rib is formed and replaces at least one of the plurality of protrusions, the squeezing rib and the gas passage dividing rib of the second separator squeezing the power generating reaction portion, wherein the squeezing rib has a plurality of communicating passages being divided from one another and which cause the gas passage portions located on opposite sides of the squeezing rib to communicate with each other, and wherein, at the region of the first separator, a contact area of the squeezing rib with the power generating reaction portion is adapted to be larger than a contact area of the protrusion of the first separator with the power generating reaction portion in a case where the protrusion were formed without forming the squeezing rib at the region of the first separator.

2. A fuel cell according to claim 1, wherein the squeezing rib is adapted to be longer, in a direction in which the gas passage dividing rib of the first separator extends, than the protrusion in a case where the protrusion were formed without forming the squeezing rib at the region of the first separator.

3. A fuel cell according to claim 1, wherein the squeezing rib is divided into a plurality of divided portions in a direction parallel to a direction in which the gas passage dividing rib of the first separator extends, opposing ends of adjacent divided portions of the squeezing rib being overlapped to each other in the extending direction of the squeezing rib when viewed in a direction perpendicular to the extending direction of the squeezing rib.

4. A fuel cell according to claim 1, wherein the squeezing rib is divided into a plurality of divided portions in a direction parallel to a direction in which the gas passage dividing rib of the first separator extends, a space between adjacent divided portions of the squeezing rib being adapted to be smaller than a space between adjacent protrusions in a case where the protrusion were formed without forming the squeezing rib at the region of the first separator.

5. A fuel cell according to claim 1, wherein a gas passage division ratio by the gas passage dividing rib of the first separator where the squeezing rib is formed is the same as a gas passage division ratio by the gas passage dividing rib of the first separator in a case where the protrusion were formed without forming the squeezing rib at the region of the first separator.

6. A fuel cell according to claim 1, wherein the gas passage is a serpentine passage and a width of the serpentine passage is adapted to be such that a width of a downstream portion of the serpentine passage is smaller than a width of an upstream portion of the serpentine passage.

7. A fuel cell according to claim 1, wherein the first and second separators are carbon separators.

8. A fuel cell according to claim 1, wherein the first and second separators are metal separators.

9. A fuel cell according to claim 1, wherein the gas passage is a serpentine passage.

10. A fuel cell according to claim 1, wherein the gas passage is a straight passage.

* * * * *